United States Patent
Hood et al.

(10) Patent No.: US 10,144,064 B2
(45) Date of Patent: Dec. 4, 2018

(54) APPARATUS FOR MANUFACTURING AN ARTICLE FROM POWDER MATERIAL

(71) Applicant: ROLLS-ROYCE plc, London (GB)

(72) Inventors: Christopher Hood, Derby (GB); Daniel Clark, Derby (GB)

(73) Assignee: ROLLS-ROYCE plc, Derby (GB)

( * ) Notice: Subject to any disclaimer, the term of this patent is extended or adjusted under 35 U.S.C. 154(b) by 120 days.

(21) Appl. No.: 15/481,186

(22) Filed: Apr. 6, 2017

(65) Prior Publication Data

US 2017/0209930 A1    Jul. 27, 2017

Related U.S. Application Data (62) Division of application No. 13/895,753, filed on May 16, 2013, now Pat. No. 9,649,689.

(30) Foreign Application Priority Data

May 30, 2012    (GB) .................................... 1209567.5

(51) Int. Cl.
  *B22F 3/12*    (2006.01)
  *B22F 3/00*    (2006.01)
  (Continued)

(52) U.S. Cl.
  CPC ................ *B22F 3/12* (2013.01); *B22F 3/004* (2013.01); *B22F 3/15* (2013.01); *B22F 5/009* (2013.01);
  (Continued)

(58) Field of Classification Search
  CPC .... B22F 3/12; B22F 3/15; B22F 3/004; B22F 5/009; B22F 2203/15; B22F 2003/153;
  (Continued)

(56) References Cited

U.S. PATENT DOCUMENTS

| 2,725,288 A | 11/1955 | Dodds |
| 3,566,442 A | 3/1971 | Hakala |

(Continued)

FOREIGN PATENT DOCUMENTS

| DE | 10 2009 005 859 B3 | 4/2010 |
| JP | 2005-74494 A | 3/2005 |
| SU | 1113212 A1 | 9/1984 |

OTHER PUBLICATIONS

Sep. 26, 2012 Search Report issued in British Patent Application No. 1209567.5.

*Primary Examiner* — Nicolas A Arnett
(74) *Attorney, Agent, or Firm* — Oliff PLC (57) ABSTRACT

An apparatus for manufacturing an article from powder material including a first table, a second table rotatably mounted on the first table about a first axis and a third table rotatably mounted on the second table about a second axis. A hollow canister is supported by the third table. A vibrator is arranged to vibrate the canister. A first device is arranged to rotate the second table about the first axis and a second device is arranged to rotate the third table about the second axis. A hopper is arranged to supply powder material into the canister and a valve controls the flow of powder material from the hopper into the canister. A processor is arranged to control the valve, the vibrator, the first device and the second device to control the filling and packing density of the canister.

4 Claims, 5 Drawing Sheets

(51) Int. Cl.
  *B22F 3/15* (2006.01)
  *B22F 5/00* (2006.01)
  *B28B 13/02* (2006.01)
  *B30B 11/00* (2006.01)
  *B30B 11/02* (2006.01)
  *B30B 15/02* (2006.01)
  *C04B 35/645* (2006.01)

(52) U.S. Cl.
  CPC ............ *B28B 13/02* (2013.01); *B30B 11/005* (2013.01); *B30B 11/022* (2013.01); *B30B 15/022* (2013.01); *C04B 35/6455* (2013.01); *B22F 2003/153* (2013.01); *B22F 2203/15* (2013.01); *B22F 2998/10* (2013.01); *B22F 2999/00* (2013.01)

(58) Field of Classification Search
  CPC ............ B22F 2998/10; B22F 2999/00; C04B 35/6455; B30B 11/022; B30B 11/005; B30B 15/022; B28B 13/02
  See application file for complete search history.

(56) References Cited

U.S. PATENT DOCUMENTS

| | | |
|---|---|---|
| 3,622,313 A | 11/1971 | Havel |
| 4,225,300 A | 9/1980 | Latter |
| 4,491,302 A | 1/1985 | Asari et al. |
| 4,693,863 A | 9/1987 | Del Corso et al. |
| 4,720,256 A | 1/1988 | Asari et al. |
| 4,738,610 A | 4/1988 | Chiang et al. |
| 4,756,680 A | 7/1988 | Ishii |
| 4,772,450 A | 9/1988 | Friedman |
| 4,797,085 A | 1/1989 | Chiang et al. |
| 4,921,666 A | 5/1990 | Ishii |
| 4,983,112 A | 1/1991 | Uehara et al. |
| 5,811,135 A | 9/1998 | Kimura |
| 5,849,244 A | 12/1998 | Rhodes et al. |
| 6,336,480 B2 | 1/2002 | Gaylo et al. |
| 7,735,714 B2 | 6/2010 | Midgett |
| 9,199,309 B2 | 12/2015 | Hood |
| 9,248,502 B2 | 2/2016 | Hood |
| 9,649,689 B2 * | 5/2017 | Hood ............. B22F 3/004 |
| 2012/0043685 A1 | 2/2012 | Hu et al. |
| 2013/0115126 A1 | 5/2013 | Hood |
| 2013/0318989 A1* | 12/2013 | Hood ............. B22F 3/004 60/772 |

* cited by examiner

APPARATUS FOR MANUFACTURING AN ARTICLE FROM POWDER MATERIAL

The present application is a divisional application of U.S. patent application Ser. No. 13/895,753 filed May 16, 2013, which prior application is incorporated herein by reference in its entirety.

The present invention relates to an apparatus and a method of manufacturing an article form powder material, more particularly to an apparatus and a method of manufacturing an article from powder material by hot isostatic pressing.

Conventionally powder metal articles are manufactured by filling a canister with powder metal, sealing the filled canister, evacuating gases from the sealed canister, heating and pressing, e.g. hot isostatic pressing (HIP), the canister to consolidate the powder metal to form a powder metal article and finally removing the canister from the powder metal article.

Hot isostatic pressing is a processing technique in which high isostatic pressure is applied to a powder material contained in a sealed and evacuated canister at a high temperature to produce a substantially 100% dense article. The industry standard is to manufacture the canisters used in the hot isostatic pressing process from mild steel sheet up to approximately 3 mm thick. The canister conventionally used comprises a plurality of separate portions which are joined together by welded joints to form the completed canister. During the hot isostatic pressing cycle, the canister collapses as a result of the high gas pressures and high temperatures applied and results in compaction, or consolidation, of the powder material.

As a consequence of the capability of the hot isostatic pressing process to control size and shape, the canisters are currently designed to produce articles which are considerably oversize, with generally a minimum oversize of about 5 mm. This is considered to be near net shape. The additional material in the oversized article adds a considerable amount of extra material, and there is the cost of the extra material. The extra material has to be removed, for example by machining, after the hot isostatic process to result in the final size and final shape of the finished powder metal article and this adds more cost. The additional material has to undergo hot isostatic processing and increases the duration of the hot isostatic processing due to the increased thermal mass of the additional material.

Currently the powder metal article is produced oversize, as mentioned above, and it is necessary to remove the excess metal from the powder metal article by machining such that the finished powder metal article has the required final shape and final dimensions.

A problem experienced during the filling of a canister designed to produce a net shape powder metal article is that there may be regions within the canister which have relatively small dimensions through which the powder metal has to flow in order completely fill all of the canister. In this type of canister the powder metal flowing into the canister may form blockages within the region, or regions, of the canister which have relatively small dimensions and these blockages choke, or prevent, the flow of powder metal to other regions of the canister. This will produce a variation in the packing density of the powder metal in the canister and will produce a variation in the shrinkage of the powder metal in the powder metal article.

There is a requirement to accurately predict the final shape and/or the final size of the powder metal article. The final shape and/or the final size of the powder metal article is dependent upon the shrinkage, compaction or consolidation, of the powder metal during the hot isostatic pressing. The shrinkage, compaction or consolidation, is dependent upon the packing density of the powder metal within the canister, because the powder metal compacts in the canister to fill any voids within the canister. A consequence of uneven packing density of the powder metal within a canister is that there is uneven shrinkage within the powder metal article. A further consequence of uneven packing density of the powder metal within a canister is that one powder metal article may have the powder metal packed to a different density than another powder metal article and hence the process does not produce powder metal articles with consistent density. Another consequence of uneven packing density of the powder metal within a canister is that one powder metal article may have the powder metal packed to a particular density at a particular region and another powder metal article may have the powder metal packed to a different density at the particular region and hence the process does not produce powder metal articles with consistent density at particular regions.

There is a need to uniformly fill canisters such that the packing density of powder metal in each canister and that the packing density of the powder metal at all regions in the canister is the same or that there is a minimum variation in packing density throughout the canister. If there is a variation in the packing density of the powder metal in a canister there is a need for the variation in the packing density of the powder metal in the canister to be the same for all canisters producing a particular powder metal article such that the powder metal articles are produced consistently the same.

A solution to the problem is to revert to the production of an oversize powder metal article and to machine to the required shape and dimensions.

It is known from U.S. Pat. No. 5,849,244 to provide a canister on a table which is vibrated during the filling of the canister to improve the packing density of the powder metal in the canister. U.S. Pat. No. 5,849,244 also discloses the use of weighing scale to measure the weight of powder metal remaining in a hopper and hence the weight of powder metal supplied from the hopper into the canister.

The present invention seeks to provide an apparatus for manufacturing a powder metal article which reduces, preferably overcomes, the above mentioned problems.

Accordingly the present invention provides an apparatus for manufacturing an article from powder material comprising a first table, a second table rotatably mounted on the first table about a first axis, a third table rotatably mounted on the second table about a second axis, a hollow canister supported by the third table, a vibrator arranged to vibrate the canister, a first device to rotate the second table about the first axis, a second device to rotate the third table about the second axis, a hopper arranged to supply powder material into the canister, a valve to control the flow of powder material from the hopper into the canister and a processor to control the valve, the vibrator, the first device and the second device to control the filling of the canister.

Preferably the second table is rotatably mounted about a vertical axis and the third table is rotatably mounted about a horizontal axis or the second table is rotatably mounted about a horizontal axis and the third table is rotatably mounted about an axis arranged in a plane perpendicular to the horizontal axis.

The second axis may be arranged in a plane perpendicular to the first axis

The apparatus may additionally comprise a device to measure the weight of any powder material in the canister, at least one sensor to measure the depth of any powder material in the canister, the processor being arranged to analyse the measured depth of any powder material in the canister, the processor being arranged to determine if the measured depth of any powder material in the canister corresponds to the measured weight of any powder material in the canister and if the processor determines that the measured depth of powder material in the canister is greater than the depth of powder material corresponding to the weight of powder material in the canister then the processor is arranged to vibrate the canister and/or rotate the second table and/or rotate the third table to redistribute any powder material in the canister.

The processor may comprise a database containing the density of the powder material, the volume of the canister, the total depth of the canister, the cross-sectional area of the volume of the canister at different heights of the canister.

The processor may comprise a database relating the depth of powder material in the canister to the weight of powder material in the canister.

The processor may be arranged to determine a calculated depth of powder material in the canister from the density of the powder material, the cross-sectional area of the volume of the canister at different heights and the measured weight of powder material in the canister.

The processor may be arranged to compare the calculated depth of powder material in the canister with the measured depth of powder material in the canister and if the measured depth of powder material in the canister differs from the calculated depth of powder material by more than a predetermined amount the processor is arranged to vibrate the canister and/or rotate the second table and/or rotate the third table.

The processor may comprise a database of the behaviour of different powder materials. The database may contain flow characteristics of different powder materials, size distribution of the particles of the different powder materials. The database may contain information on the flow characteristics of the different powder materials with different surface finishes of the canister. The processor may compare information pertaining to the particular batch of powder material with the information in the database. The processor may compare information pertaining to the surface finish of the canister with the information in the database.

There may be at least one first sensor arranged at an end of the canister to measure the depth of any powder material in the canister. There may be at least one second sensor arranged to measure the depth of any powder material in the canister at a particular region of the canister. There may be at least one third sensor arranged to move up and down and around the canister to measure the depth of any powder material in the canister.

The at least one sensor may comprise an ultrasonic sensor, an X-ray sensor or an optical sensor.

The present invention seeks to provide a method of manufacturing a powder metal article which reduces, preferably overcomes, the above mentioned problems.

The present invention also provides a method of manufacturing an article from powder material comprising forming a hollow canister, supplying powder material into the hollow canister, vibrating the canister and/or rotating the canister about a first axis and/or rotating the canister about a second axis while the powder material is supplied into the canister, and controlling the flow of powder material into the canister, the vibrating of the canister, the rotating of the canister about the first axis and the rotating of the canister about the second axis to control the filling of the canister.

The second axis may be arranged in a plane perpendicular to the first axis.

The method may comprise rotating the canister about a vertical axis and rotating the canister about a horizontal axis.

The method may additionally comprise measuring the weight of any powder material in the canister, measuring the depth of any powder material in the canister, analysing the measured depth of any powder material in the canister, determining if the measured depth of any powder material in the canister corresponds to the measured weight of any powder material in the canister and vibrating the canister and/or rotating the canister about the first axis and/or rotating the canister about the second axis if the measured depth of powder material in the canister is greater than the depth of powder material corresponding to the weight of powder material in the canister to redistribute any powder material in the canister.

The method may comprise providing a database containing the density of the powder material, the volume of the canister, the total depth of the canister, the cross-sectional area of the volume of the canister at different heights of the canister.

The method may comprise providing a database relating the depth of powder material in the canister to the weight of powder material in the canister.

The method may comprise determining a calculated depth of powder material in the canister from the density of the powder material, the cross-sectional area of the volume of the canister at different heights and the measured weight of powder material in the canister.

The method may comprise comparing the calculated depth of powder material in the canister with the measured depth of powder material in the canister and vibrating the canister and/or rotating the canister about the first axis and/or rotating the canister about the second axis if the measured depth of powder material in the canister differs from the calculated depth of powder material by more than a predetermined amount.

The method may comprise providing a database of the behaviour of different powder materials. The database may contain flow characteristics of different powder materials, size distribution of the particles of the different powder materials. The database may contain information on the flow characteristics of the different powder materials with different surface finishes of the canister. The method may comprise inputting information pertaining to the particular batch of powder material into the processor for comparison with the information in the database.

The method may comprise measuring the geometry of the canister. The method may comprise measuring the internal surface of the canister to determine its surface finish, or surface roughness. The method may comprise inputting the information pertaining to the surface finish of the canister into the processor for comparison with the information in the database.

The method may comprise arranging at least one first sensor at an end of the canister to measure the depth of any powder material in the canister.

The method may comprise arranging at least one second sensor to measure the depth of any powder material in the canister at a particular region of the canister.

The method may comprise providing at least one third sensor, moving the at least one third sensor up and down and around the canister to measure the depth of any powder material in the canister.

The method may comprise vibrating the canister at a frequency in the range of 10 to 100 Hz. The method may comprise vibrating the canister at a frequency of 10 to 20 Hz.

The method may comprise rotating the canister back and forth about the first axis. The method may comprise rotating the canister back and forth about the first axis through up to 45°. The method may comprise rotating the canister back and forth about the first axis through up to 30°. The method may comprise rotating the canister back and forth about the first axis through up to 10°.

The method may comprise rotating the canister about the second axis back and forth about the second axis. The method may comprise rotating the canister back and forth about the second axis through up to +/−45°.

The method may comprise forming the canister from a first cylindrical member having an outer radius and a second cylindrical member having an inner radius, the inner radius being greater than the outer radius to form an annular chamber between the first cylindrical member and the second cylindrical member.

The method may comprise forming at least one recess in an inner surface of the second cylindrical member and forming at least one recess in an outer surface of the first cylindrical member.

The method may comprise sealing the filled canister, evacuating the sealed canister to remove gases from the sealed canister, heating and pressing the canister to consolidate the powder material in the canister to form the powder material article and removing the canister from the powder material article.

The powder material article may be a gas turbine engine component. The gas turbine engine component may be a fan casing, a compressor casing, combustion chamber casing or a turbine casing.

The powder material may be a powder metal and the powder material article may be a powder metal article. The powder metal may comprise a nickel alloy, a titanium alloy or an iron alloy.

The present invention will be more fully described by way of example with reference to the accompanying drawings, in which.

Figure 1:
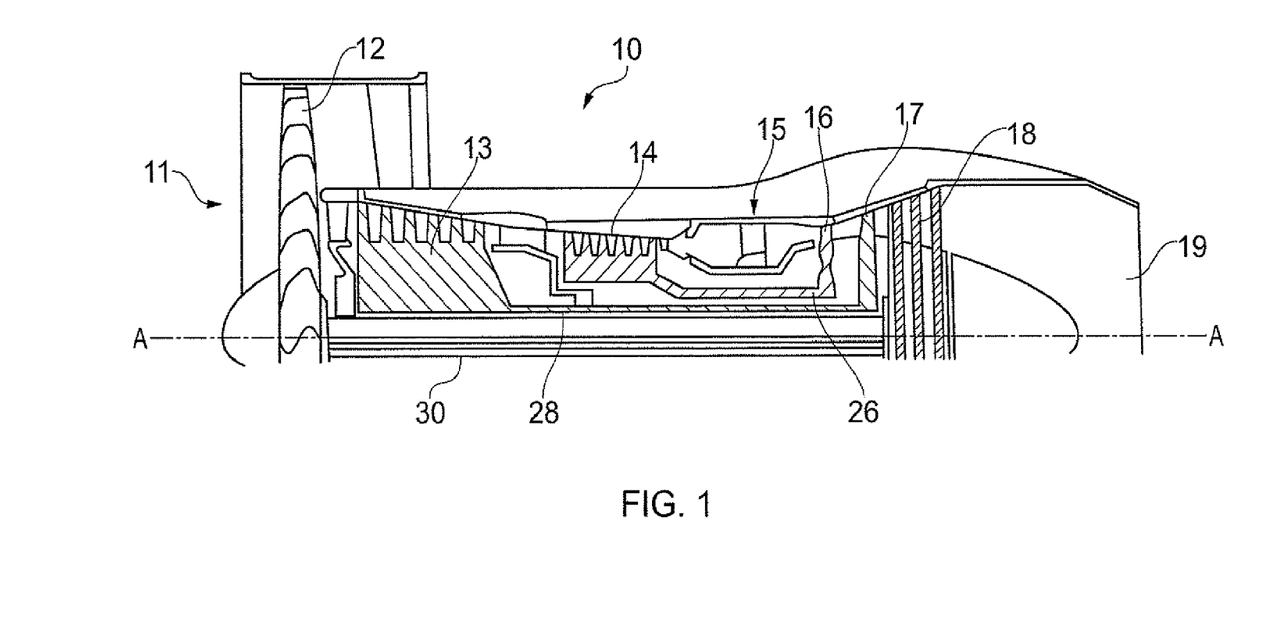
FIG. 1 is a partially cut away view of turbofan gas turbine engine showing a powder metal casing produced by the method according to the present invention.

A turbofan gas turbine engine 10, as shown in FIG. 1, comprises in flow series an intake 11, a fan 12, an intermediate pressure compressor 13, a high pressure compressor 14, a combustor 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustor 15. Fuel is injected into the combustor 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

The fan 12, the intermediate pressure compressor 13, the high pressure compressor 14, the combustor 15, the high pressure turbine 16, the intermediate pressure turbine 17 and the low pressure turbine 18 are each enclosed by a respective casing.

Figure 2:
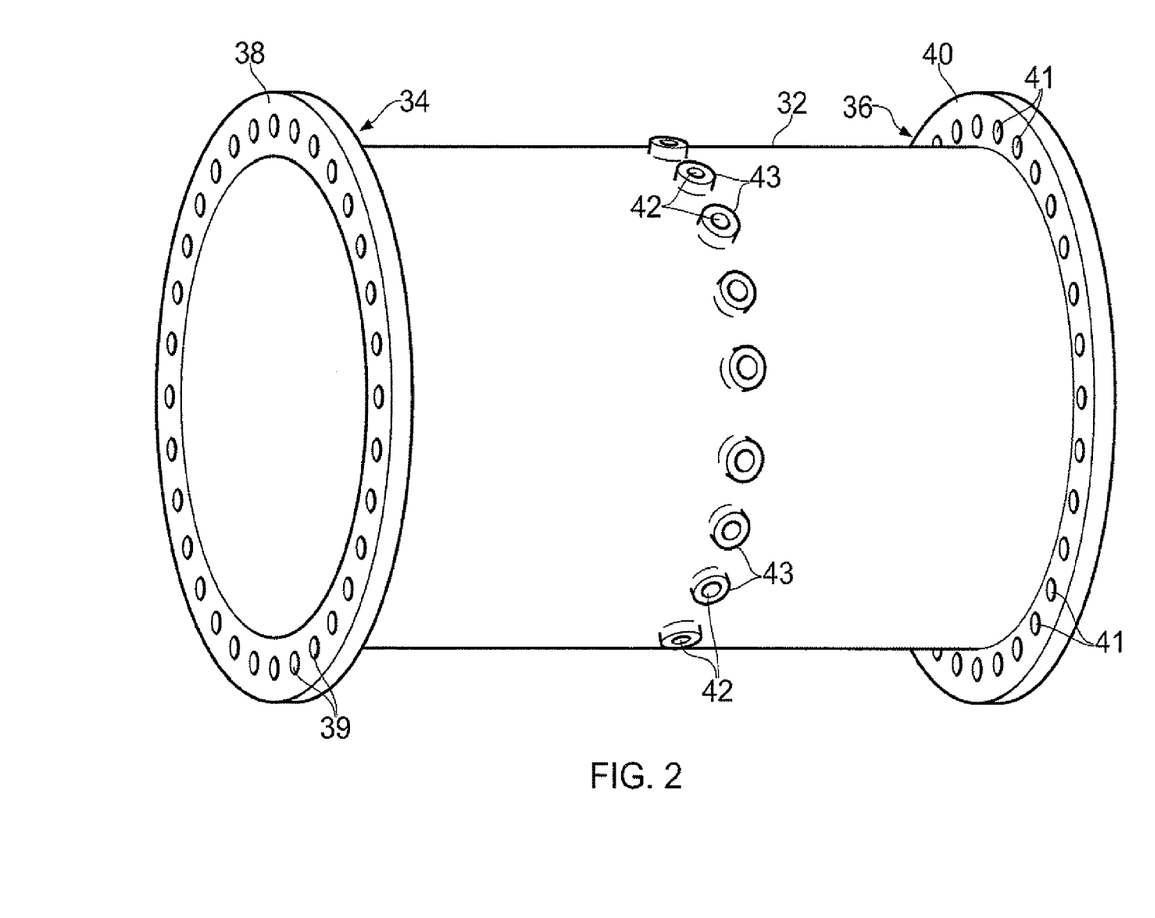
FIG. 2 is an enlarged cross-sectional view through the powder metal casing shown in FIG. 1.

A combustor casing 32 is shown more clearly in FIG. 2 and the combustor casing 32 comprises an annular radially outwardly extending flange 38 at an upstream end 34 of the combustor casing 32 and an annular radially outwardly extending flange 40 at a downstream end 36 of the combustor casing 32. The flanges 38 and 40 enable the combustor casing 32 to be secured to a casing of the adjacent high pressure compressor 14 and a casing of the high pressure turbine 16. The flanges 38 and 40 have apertures 39 and 41 respectively for bolts and nuts or other suitable fasteners to be used to secure the adjacent casings together. The combustor casing 32 also has a plurality of circumferentially spaced apertures 42, which have associated bosses 43 and threaded blind holes, to allow fuel injectors to be inserted into the combustion chamber 15.

The combustor casing 32 is manufactured by hot isostatic pressing of a powder material, e.g. a powder metal or powder alloy. The powder alloy may be a nickel-base superalloy, for example RR1000.

Figure 3:
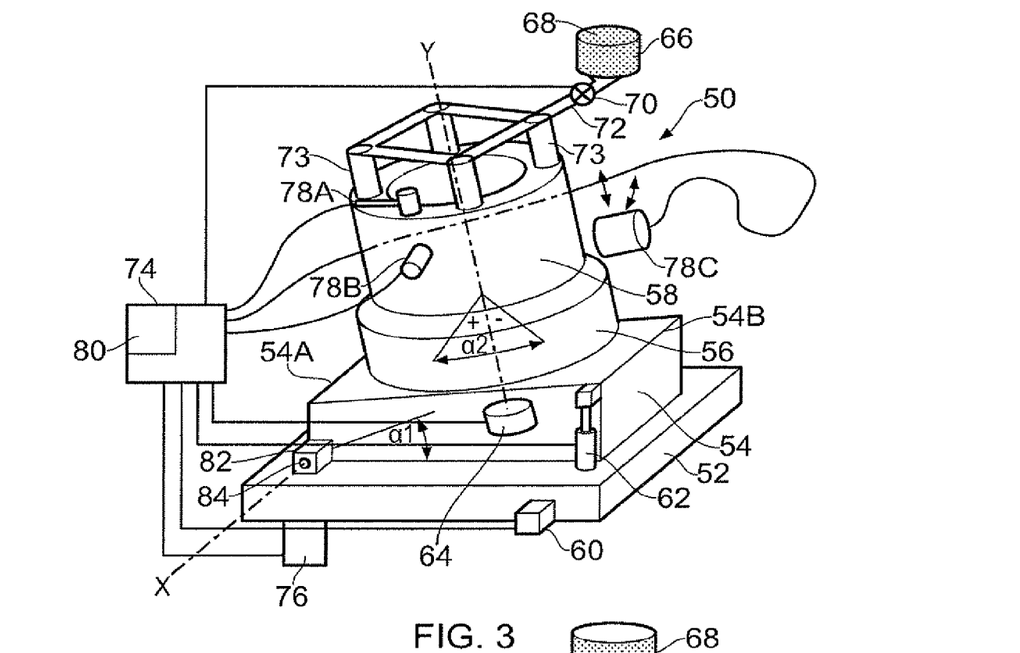
FIG. 3 is perspective view of an apparatus for manufacturing a powder metal article according to the present invention.
Figure 4:
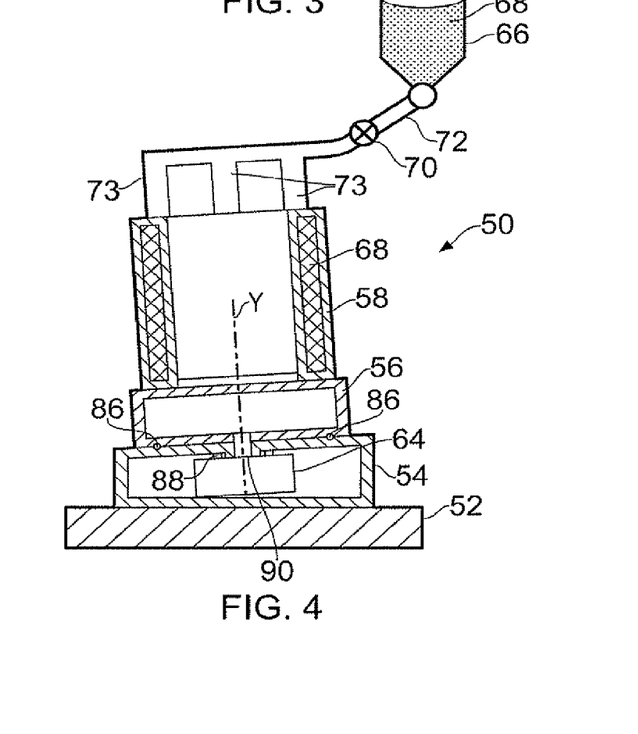
FIG. 4 is a cross-sectional view through the apparatus shown in FIG. 3.

An apparatus 50, as shown in FIGS. 3 and 4, for manufacturing an article, for example the combustor casing 32, from powder material comprises a first table 52, a second table 54 rotatably mounted on the first table 52 about a first axis X, a third table 56 rotatably mounted on the second table 54 about a second axis Y and the second axis Y is arranged in a plane perpendicular to the first axis X. A hollow canister 58 is supported by the third table 56. A vibrator 60 is arranged to vibrate the canister 58. In particular the vibrator 60 is mounted on the first table 52 and thus vibrates the first table 52, the second table 54, the third table 56 and the hollow canister 58. The vibrator 60 for example is arranged to vibrate the canister 58 at a frequency of 10 Hz to 100 Hz, more preferably at a frequency of 10 Hz to 20 Hz. A first device 62 is arranged to rotate the second table 54 about the first axis X and a second device 64 is arranged to rotate the third table 56 about the second axis Y. The first device 62 is arranged to rotate the second table 54 through angles $\alpha_1$ of up to 45°. The second device 64 is arranged to rotate the third table 56 through angles $\alpha_2$ of up to +/−45°. A hopper 66 is arranged to supply powder material 68 into the canister 58 and a valve 70 is arranged to control the flow of powder material 68 from the hopper 66 through a main supply pipe 72 and one or more feed pipes 73 into the canister 58. A processor 74 is arranged to control the valve 70, the vibrator 60, the first device 62 and the second device 64 to control the filling of the canister 58. Thus the processor 74 provides real time CNC, computer numerical control, of the valve 70, the vibrator 60, the first device 62 and the second device 64 to control the filling of the canister 58. It is to be noted in this example that the second axis Y is coaxial with the axis of the hollow canister 58.

The first device 62 is arranged to rotate the second table 54 more preferably through angles $\alpha_1$ of up to 30°, typically through angles $\alpha_1$ of up to 10°. If the second table 54 is rotated through angles at the higher end of this range it may be necessary to have flexible feed pipes 73, such as rubber. However, rubber feed pipes 73 suffer from erosion due to the powder material 68 and the rubber may lead to contamination of the powder material 68. It is preferred that the second table 54 is rotated through angles at the lower end of this range, up to 10°, such that metal feed pipes 73 may be used.

The second table 54 is rotatably mounted about a horizontal axis X. The second table 54 is rotatably mounted on the first table 52 by a pair of parallel stub shafts 84 at a first end 54A of the second table 54 and the stub shafts 84 extend in opposite directions from the opposite sides of the second table 54 at the first end 54A. The stub shafts 84 are mounted in respective bearings 82 mounted on the first table 52. The first device 62 comprises a pair of rams at the second end 54B of the second table 54. The rams 62 are mounted on the opposite sides of the second table 54 at the second end 54B and are mounted on the first table 52. The rams 62 are arranged to lift, or lower, the second end 54B of the second table 54. The rams 62 may be hydraulic rams, pneumatic rams, electric rams or other suitable types of rams.

The third table 56 is rotatably mounted about an axis Y arranged in a plane perpendicular to the horizontal axis X. The axis Y may be vertical. The third table 56 is rotatably mounted on the second table 54 by a suitable arrangement of bearings 86 and 88. As shown in FIG. 4 a first bearing 86 is provided coaxially around the axis Y and axially between the second table 54 and the third table 56. A second bearing 88 is provided between a shaft 90 extending from the third table 56 to the second device 64 and the second table 54. The second device 64 comprises for example an electric motor, but other suitable devices may be used.

The apparatus 50 additionally comprises a device 76 to measure the weight W of any powder material 68 in the canister 58, at least one sensor 78A, 78B and 78C to measure the depth D of any powder material 68 in the canister 58. The processor 74 is arranged to analyse the measured depth D of any powder material 68 in the canister 58, the processor 74 is arranged to determine if the measured depth D of any powder material 68 in the canister 58 corresponds to the measured weight W of any powder material 68 in the canister 58 and if the processor 74 determines that the measured depth D of powder material 68 in the canister 58 is greater than the depth of powder material 68 corresponding to the weight W of powder material 68 in the canister 58 then the processor 74 is arranged to vibrate the canister 58 and/or rotate the second table 54 and/or rotate the third table 56 to redistribute any powder material 68 in the canister 58.

The processor 74 may comprise a database 80 containing the density of the powder material 68, the volume of the canister 58, the total depth of the canister 58, the cross-sectional area of the volume of the canister 58 at different heights of the canister 58. The processor 74 may comprise a database 80 relating the depth of powder material 68 in the canister 58 to the weight of powder material 68 in the canister 58.

The processor 74 may be arranged to determine a calculated depth CD of powder material 68 in the canister 58 from the density of the powder material 68, the cross-sectional area of the volume of the canister 58 at different heights and the measured weight W of powder material 68 in the canister 58.

The processor 74 may be arranged to compare the calculated depth CD of powder material 68 in the canister 58 with the measured depth D of powder material 68 in the canister 58 and if the measured depth D of powder material 68 in the canister 58 differs from the calculated depth CD of powder material 68 by more than a predetermined amount the processor 74 is arranged to vibrate the canister 58 and/or rotate the second table 54 and/or rotate the third table 56.

The processor 74 may comprise a database 80 of the behaviour of different powder materials 68. In particular the database 80 may contain flow characteristics of different powder materials 68, size distribution of the particles of the different powder materials 68. The database 80 may contain information on the flow characteristics of the different powder materials 68 with different surface finishes of the canister 58. In operation information pertaining to the particular batch of powder material 68 is inputted into the processor 74 for comparison with the information in the database 80. The geometry of the canister 58 is measured and the internal surface of the canister 58 is measured to determine its surface finish, or surface roughness. In operation the information pertaining to the surface finish of the canister 58 is inputted into the processor 74 for comparison with the information in the database 80. The processor 74 may then take into account the information pertaining to the particular batch of powder material 68, e.g. the flow characteristics of the powder material 68 of the powder material 68 with different surface finishes of the canister 58 and the size distribution of the powder material 68 and the surface finish of the internal surface of the canister 58 to determine the frequency of vibration of the canister 58, the amplitude of vibration of canister 58, the angle of rotation of the canister 58 on the second table 54 about the first axis X and the angle of rotation of the canister 58 on the third table 56 about the second axis Y.

There may be at least one first sensor 78A arranged at an end of the canister 58 to measure the depth D of any powder material 68 in the canister 58. The first sensor 78A may be arranged for example at the upper end 58A of the canister 58 and be arranged to provide a view in a longitudinal, downward, direction into the canister 58. The first sensor 78A may be an ultrasonic sensor arranged to measure the time for an ultrasonic signal to travel from the first sensor 78A to any powder material 68 in the canister 58 and back to the ultrasonic sensor 78A and hence to determine the depth of any powder material 68 in the canister 58. Alternatively other suitable sensors may be used to measure the depth from the upper end 58A of the canister 58. There may be at least one second sensor 78B arranged to measure the depth of any powder material 68 in the canister 58 at a particular region of the canister 58. The second sensor 78B for example is an ultrasonic sensor, or an X-ray sensor, arranged to view through the canister 58 to determine that the powder material 68 has filled the canister 58 fully up to that particular position and the density of the powder material 68 is adequate. There may be at least one third sensor 78C arranged to move up and down and around the canister 58 to measure the depth of any powder material 68 in the canister 58. The third sensor 78C for example is an ultrasonic sensor, or an X-ray sensor, arranged to view through the canister 58 to determine that the powder material 68 has filled the canister 58 fully up to that particular position and the density of the powder material 68 is adequate. The third sensor 78C may be used to check that the whole of the canister 58 is full, or alternatively to check to make sure that there are no regions of the canister 58 which are not filled with powder material 68. Thus, there may be a first sensor 78A, a second sensor 78B or a third sensor 78C or any two of the first sensor 78A, the second sensor 78B and the third sensor 78C or a first sensor 78A, a second sensor 78B and a third sensor 78C.

The sensors 78A, 78B, 78C may be arranged to provide feedback signals to the processor 74. The processor 74 is able to adjust the amplitude of vibration and/or the frequency of vibration of the first table 52, and/or the angular extent of movement of the second table 54, and/or the angular extent of movement of the third table 56 and the processor 74 is able to determine when to adjust the amplitude of vibration and/or the frequency of vibration of the first table 52, and/or the angular extent of movement of the second table 54, and/or the angular extent of movement of the third table 56 to ensure the canister 58 is filled with powder material 68 to a controlled packing density. The processor 74 is able to adjust the amplitude of vibration and/or the frequency of vibration of the first table 52, and/or the angular extent of movement of the second table 54, and/or the angular extent of movement of the third table 56 and the processor 74 is able to determine when to adjust the amplitude of vibration and/or the frequency of vibration of the first table 52, and/or the angular extent of movement of the second table 54, and/or the angular extent of movement of the third table 56 to correct the level of filling of powder material 68 within the canister 58. The processor 74 may provide dwell times periodically to allow the level of powder material 68 to settle within the canister 58.

The at least one sensor 78A, 78B, 78C may comprise an ultrasonic sensor, an X-ray sensor or an optical sensor.

The second table 54 is rotatably mounted about a horizontal axis X and the third table 56 may be rotatably mounted about a vertical Y. Alternatively, the second table 54 may be rotatably mounted about a vertical axis X and the third table 56 may be rotatably mounted about a horizontal axis Y.

The powder material 68 may be supplied from selected ones of the feed pipes 73 when the third table 56 is positioned at different angles.

If one or more of the sensors 78A, 78B or 78C determines that the measured level of powder material 68 in the canister 58 is too high for the amount of powder material 68 supplied into the canister 58, or that there is a region of the canister 58 which is not filled adequately with powder material 68 then the processor 74 vibrates the canister 58 and/or rotates the canister 58 about the axis X and/or rotates the canister 58 about axis Y so that the unfilled region of the canister 58 is filled with powder material 68 and/or so that the measured level of powder material 68 in the canister 58 corresponds to the amount of powder material 68 supplied into the canister 58.

The processor 74 may operate any one of the vibrator 60 to vibrate the first table 52, the first device 62 to rotate the second table 54 or the second device 64 to rotate the third table 56. Alternatively the processor 74 may operate any two of the vibrator 60 to vibrate the first table 52, the first device 62 to rotate the second table 54 or the second device 64 to rotate the third table 56. The processor 74 may operate all three of the vibrator 60 to vibrate the first table 52, the first device 62 to rotate the second table 54 or the second device 64 to rotate the third table 56.

Most powder material, powder metal, consists of spherical particles. However, the nickel base superalloy known as RR1000 consists of approximately 90% spherical particles, 8% spherical particles with smaller particles attached thereto and approximately 2% irregular shaped particles. RR1000 consists of 18.5 wt % cobalt, 15 wt % chromium, 5 wt % molybdenum, 2 wt % tantalum, 3.6 wt % titanium, 3 wt % aluminium, 0.5 wt % hafnium, 0.06 wt % zirconium, 0.027 wt % carbon, 0.015 wt % boron and the balance nickel plus incidental impurities.

There are problems with using powder metal RR1000, firstly the tubes supplying the powder metal may become clogged with powder metal and secondly and more importantly the powder metal does not flow easily from the filling sites adjacent to the tubes supplying the powder metal into the canister. This problem is exacerbated if the canister has a complex shape, for example if the canister has recesses to define flanges and/or bosses etc in the finished article.

In operation a supply of powder material, powder metal, 68 is maintained in the hopper 66 and the powder material 68 is maintained in an inert atmosphere, e.g. argon, helium or nitrogen, at atmospheric pressure within the hopper 66. The inert atmosphere may be any suitable clean and dry gas which does not have any impurities to react with or contaminate the power metal. The canister 58 is initially rinsed with alcohol to remove moisture, or water, from the canister. The canister 58 is then heated to remove the alcohol from the canister 58. The canister 58 is then purged with an inert atmosphere, e.g. argon, helium or nitrogen or any suitable clean and dry gas which does not have any impurities to react with or contaminate the power metal. The canister 58 is purged with the inert atmosphere either during the heating of the canister 58 to remove the alcohol or just after the heating of the canister 58 to remove the alcohol. The canister 58 is purged with a flow of inert gas at a flow rate of 18 to 20 litres per minute or a higher flow rate. The hopper 66 and the canister 58 are then connected together via the pipe 72 in a sealed chamber, e.g. a bag, to prevent air entering the canister 58 and/or the hopper 66.

During the filling of the canister 58 with powder metal 68 from the hopper 66 the canister 58 is heated to prevent the condensation of moisture in the canister 58 and to aid the flow of the powder metal 68 within the canister 58 from the point or points of supply of powder metal 68 into the canister 58. The hopper 66 is positioned at a position above the canister 58 so that there is a flow of powder metal 68 from the hopper 66 to the canister 58 due to gravity. In addition a pressure difference is maintained between the hopper 66 and the canister 58 to aid the flow of powder metal 68 into the canister 58 from the hopper 66 to assist the gravity feed of powder metal 68 from the hopper 66 to the canister 58.

During the filling of the canister 58 the canister 58 may be rotated about the first axis X, the second axis Y and vibrated as discussed above to redistribute the powder metal throughout the canister 58 to ensure that the powder metal 68 fills the whole of the canister 58. This is especially important for a complex shaped canister 58 which includes recesses etc to define bosses and/or flanges on the finished powder metal article 32.

In one arrangement in all modes of operation the first axis X is horizontal. In modes of operation in which the first device 62 and the second device 64 have not been actuated the second axis Y is vertical. In some modes of operation in which the first device 62 has been actuated the second axis Y is not vertical.

After the canister 58 is completely filled with powder metal, a leak check is performed by applying a vacuum to the canister 58 and determining if any gas leaks into the canister 58 by measuring the pressure within the canister 58 to determine if the pressure rises within the canister 58. If the canister 58 passes the leak check the tubes 72 are sealed by crimping and then the tubes 72 are further sealed by welding, e.g. spot welding etc.

The evacuated and sealed canister 58 containing power metal 68 is then placed in a HIP vessel and hot isostatically pressed at a high temperature and high pressure to consolidate the powder metal and diffusion bond the powder metal particles together to form a powder metal article 32. The canister 58 is then removed from the powder metal article 34 by machining the canister 58 and/or dissolving the canister 58 in acid.

Alternatively, the canister 58 may be a multi-part canister 58 which may be removed from the powder metal article 32.

The powder metal article 32 may be a net shape article which only requires a minor amount of machining to provide apertures 42 through bosses and/or apertures through flanges 38 and 40 and finish machining of the bosses and flanges 38 and 40 etc.

Figure 5:
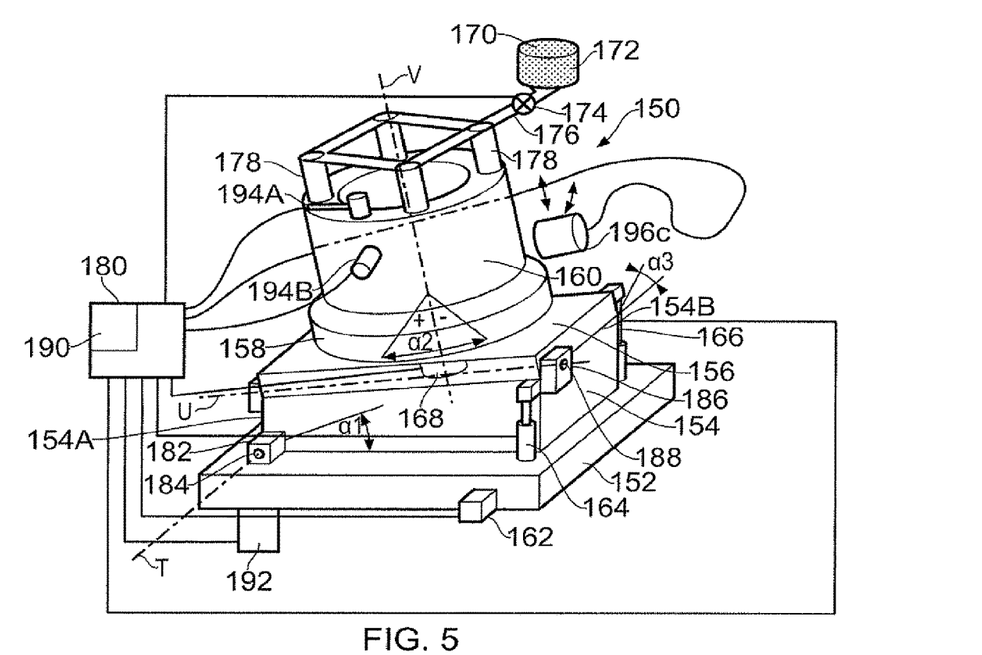
FIG. 5 is a perspective view of another apparatus for manufacturing a powder metal article according to the present invention.

Another apparatus 150 for manufacturing an article, for example a combustor casing 32, from powder material is shown in FIG. 5. The apparatus 150 is similar to that shown in FIGS. 3 and 4 and comprises a first table 152, a second table 154 rotatably mounted on the first table 152 about a first axis T, a third table 156 rotatably mounted on the second table 154 about a second axis U and a fourth table 158 rotatably mounted on the third table 156 about a third axis V. The second axis U is arranged in a plane perpendicular to the first axis T and the third axis V is arranged in a plane perpendicular to the second axis U. A hollow canister 160 is supported by the fourth table 158. A vibrator 162 is arranged to vibrate the canister 160. In particular the vibrator 162 is mounted on the first table 152 and thus vibrates the first table 152, the second table 154, the third table 156, the fourth table 158 and the hollow canister 160. The vibrator 162 for example is arranged to vibrate the canister 160 at a frequency of 10 Hz to 100 Hz, more preferably at a frequency of 10 Hz to 20 Hz. A first device 164 is arranged to rotate the second table 154 about the first axis T, a second device 166 is arranged to rotate the third table 156 about the second axis U and a third device 168 is arranged to rotate the fourth table 158 about the third axis V. The first device 164 is arranged to rotate the second table 154 through angles $\alpha_1$ of up to 45°. The second device 166 is arranged to rotate the third table 156 through angles $\alpha_3$ of up to 45°. The third device 168 is arranged to rotate the fourth table 158 through angles $\alpha_2$ of up to +/−45°. A hopper 170 is arranged to supply powder material 172 into the canister 160 and a valve 174 is arranged to control the flow of powder material 172 from the hopper 170 through a main supply pipe 176 and one or more feed pipes 178 into the canister 160. A processor 180 is arranged to control the valve 174, the vibrator 162, the first device 164, the second device 166 and the third device 168 to control the filling of the canister 160. Thus the processor 180 provides real time CNC, computer numerical control, of the valve 174, the vibrator 162, the first device 164, the second device 166 and the third device 168 to control the filling of the canister 160. It is to be noted in this example that the third axis V is coaxial with the axis of the hollow canister 160.

The first device 164 is arranged to rotate the second table 154 more preferably through angles $\alpha_1$ of up to 30°, typically through angles $\alpha_1$ of up to 10°. It is preferred that the second table 154 is rotated through angles at the lower end of this range, up to 10°, such that metal feed pipes 178 may be used.

The second table 154 is rotatably mounted about a horizontal axis T. The second table 154 is rotatably mounted on the first table 152 by a pair of parallel stub shafts 184 at a first end 154A of the second table 154 and the stub shafts 184 extend in opposite directions from the opposite sides of the second table 154 at the first end 154A. The stub shafts 184 are mounted in respective bearings 182 mounted on the first table 152. The first device 164 comprises a pair of rams at the second end 154B of the second table 154. The rams 164 are mounted on the opposite sides of the second table 154 at the second end 1546 and are mounted on the first table 152. The rams 164 are arranged to lift, or lower, the second end 1546 of the second table 154. The rams 164 may be hydraulic rams, pneumatic rams, electric rams or other suitable types of rams.

The third table 156 is rotatably mounted about an axis U and the axis U is arranged in a plane perpendicular to the axis T. The axis U may be horizontal. The third table 156 is rotatably mounted on the second table 154 by a pair of parallel stub shafts 188 at a first end 156A of the third table 156 and the stub shafts 184 extend in opposite directions from the opposite sides of the third table 156 at the first end 156A. The stub shafts 188 are mounted in respective bearings 186 mounted on the second table 154. The second device 166 comprises a pair of rams at the second end 1566 of the third table 156. The rams 166 are mounted on the opposite sides of the third table 156 at the second end 156B and are mounted on the second table 154. The rams 166 are arranged to lift, or lower, the second end 1566 of the third table 156. The rams 166 may be hydraulic rams, pneumatic rams, electric rams or other suitable types of rams.

The fourth table 158 is rotatably mounted about an axis V arranged in a plane perpendicular to the axis U. The axis V may be vertical. The fourth table 158 is rotatably mounted on the third table 156 by a suitable arrangement of bearings, not shown, similar to those shown in FIG. 4. The third device 168 comprises for example an electric motor, but other suitable devices may be used. The axis V is arranged in a plane perpendicular to the axis T.

The processor 180 may comprise a database 190 of the behaviour of different powder materials 172, as described with reference to FIGS. 3 and 4. The apparatus 150 additionally comprises a device 192 to measure the weight W of any powder material 172 in the canister 160, at least one sensor 192A, 192B and 192C to measure the depth D of any powder material 172 in the canister 160.

The apparatus 150 operates in a manner similar to that describe with reference to FIGS. 3 and 4 but the processor 180 controls the valve 174, the vibrator 162, the first device 164, the second device 166 and the third device 168 to control the filling of the canister 160.

The processor 150 may operate any one of the vibrator 162 to vibrate the first table 152, the first device 164 to rotate the second table 154, the second device 166 to rotate the third table 156 or the third device 168 to rotate the fourth table 158. Alternatively the processor 150 may operate any two of the vibrator 162 to vibrate the first table 152, the first device 164 to rotate the second table 154, the second device 166 to rotate the third table 156 or the third device 168 to rotate the fourth table 158. The processor 150 may operate any three of the vibrator 162 to vibrate the first table 152, the first device 164 to rotate the second table 154, the second device 166 to rotate the third table 156 or the third device 168 to rotate the fourth table 158. The processor 150 may operate all four of the vibrator 162 to vibrate the first table 152, the first device 164 to rotate the second table 154, the second device 166 to rotate the third table 156 and the third device 168 to rotate the fourth table 158.

In one arrangement in all modes of operation the first axis T is horizontal. In modes of operation in which the first device 164 and the second device 166 have not been actuated the second axis U is horizontal and the third axis V is vertical. In some modes of operation in which the first device 164 has not been actuated and the second device 166 has been actuated the second axis U is horizontal and the third axis V is not vertical. In some modes of operation in which the first device 164 has been actuated and the second device 166 has been actuated the second axis U is not horizontal and the third axis V is not vertical.

Figure 6:
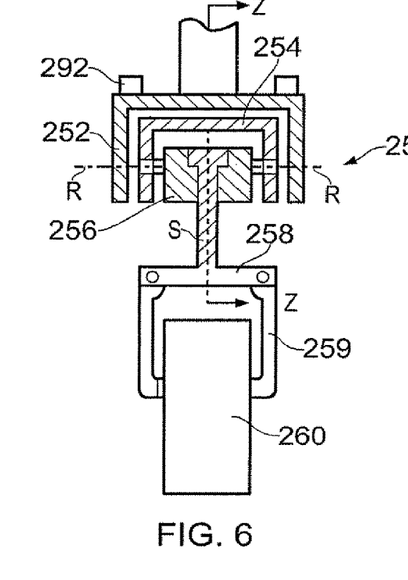
FIG. 6 is a cross-sectional view of a further apparatus for manufacturing a powder metal article according to the present invention.
Figure 7:
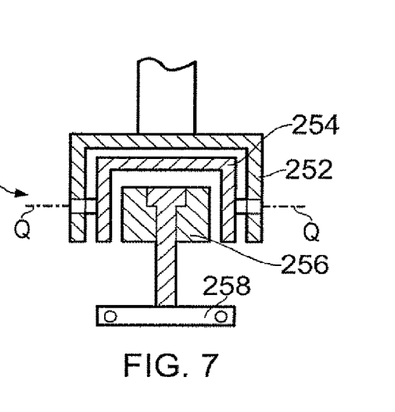
FIG. 7 is a cross-sectional view in the direction of arrows Z-Z in FIG. 6.

A further apparatus 250 for manufacturing an article, for example the combustor casing 32, from powder material is shown in FIGS. 6 and 7. The apparatus 250 is similar to and operates in a similar manner to that shown in FIGS. 3 and 4 and comprises a first support 252, a second support 254 rotatably mounted on the first support 252 about a first axis Q, a third support 256 rotatably mounted on the second support 254 about a second axis R and a fourth support 258 rotatably mounted on the support table 256 about a third axis S. The second axis R is arranged in a plane perpendicular to the first axis Q and the third axis S is arranged in a plane perpendicular to the second axis R. A hollow canister 260 is supported by the fourth support 258 by grabs 259. The hollow canister 260 is suspended by the supports in this example rather than resting on the tables in the previous examples. The apparatus 250 is also provided with a vibrator, devices to rotate the supports, sensors to measure the weight, sensors to measure the level of powder metal in the canister, a hopper for powder metal, pipes to supply the powder metal into the canister and a processor but these have been omitted for clarity. The vibrator may be mounted on the first support. It is to be noted in this example that the third axis S is coaxial with the axis of the hollow canister 260.

Figure 8:
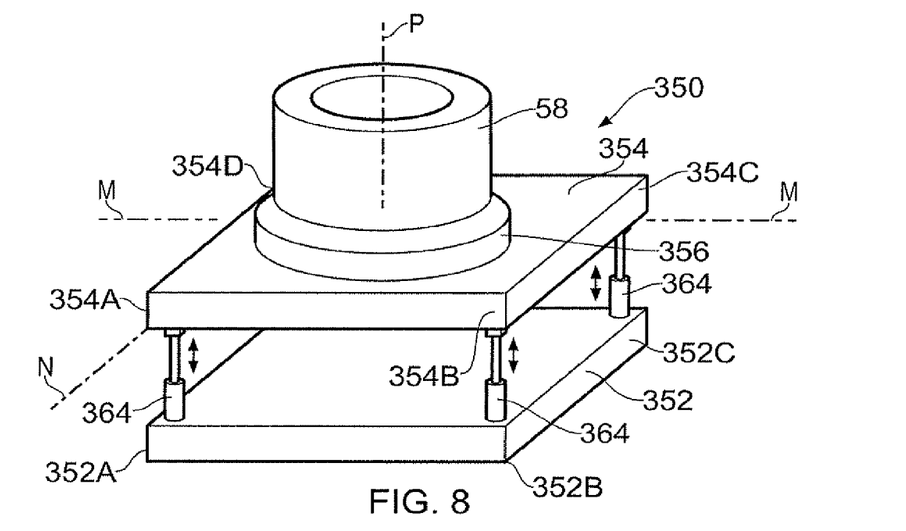
FIG. 8 is a perspective view of an additional apparatus for manufacturing a powder metal article according to the present invention.

An additional apparatus 350 for manufacturing an article, for example a combustor casing 32, from powder material is shown in FIG. 8. The apparatus 350 comprises a a first table 352, a second table 354 movably mounted on the first table 352 and a third table 356 rotatably mounted on the second table 354. A hollow canister 58 is supported by the third table 356. The second table 354 is movably mounted on the first table 352 by a plurality of rams 364, one ram 364 is provide at each corner 352A, 352B, 352C, 352D of the first table 352 to support a corresponding corner 354A, 354B, 354C and 354D on the second table 354. Each ram 364 is connected to the corresponding corner of the first table 352 by a universal joint (not shown) and is connected to the corresponding corner of the second table 354 by a universal joint (not shown). The third table 356 is rotatably mounted on the second table 354 about an axis P arranged perpendicular to the plane of the second table 354. The rams 364 may be operated hydraulically, pneumatically or electrically. Two of the rams 364 along a first side, connecting corners 352A and 352B, of the first table 352 may be operated to lift the corresponding first side, connecting corners 354A and 354B, of the second table 354 while the other rams 364 remain un-operated and hence produce a rotation around a horizontal axis M at the second, opposite, side of the second table 354. Alternatively, two of the rams 364 along a first side, connecting corners 352A and 352B, of the first table 352 may be operated to lift the corresponding first side, connecting corners 354A and 354B, of the second table 354 while the other two rams 364 along the second side, connecting corners 352C and 352D of the first table 352 may be operated to lower the corresponding second side, connecting corners 354C and 354D, of the second table 354 and hence produce a rotation around a horizontal axis between the first and second sides of the second table 354. Similarly two of the rams 364 along a third side, connecting corners 352B and 352C, of the first table 352 may be operated to lift the corresponding third side, connecting corners 354B and 354C, of the second table 354 while the other rams 364 remain un-actuated and hence produce a rotation around a horizontal axis N at the fourth, opposite, side, connecting corners 354A and 354D, of the second table 354, where the third and fourth sides of the first table 352 are the sides perpendicular to the first and second sides of the first table 352. The ram 364 at a corner 352A of the first table 352 may be operated to lift the corresponding corner 354A of the second table 354, the ram 364 at an opposite corner 352C may be operated to lower the corresponding corner 354C of the second table 354 while the rams 364 at the other corners 352B and 352D of the first table 352 remain unoperated to provide rotation around an axis extending between the corners 354B and 354D of the second table 354. Other permutations of operation and unoperation of the rams is possible to provide tilting of the second table 354. It is to be noted in this example that the axis P is coaxial with the axis of the hollow canister 58. This may operated in a manner similar to that in FIG. 5.

The apparatus 350 is also provided with a vibrator, devices to move the second table relative to the first table, a device to rotate the third table, sensors to measure the weight, sensors to measure the level of powder metal in the canister, a hopper for powder metal, pipes to supply the powder metal into the canister and a processor but these have been omitted for clarity. The vibrator may be mounted on the first table.

Figure 9:
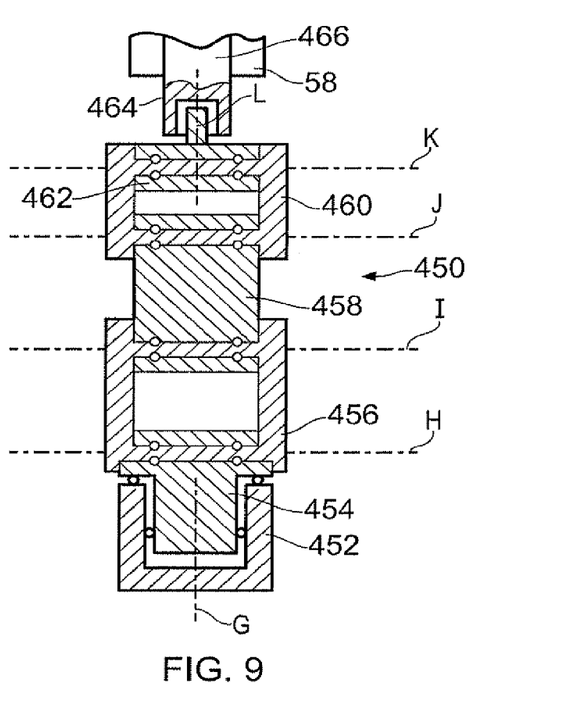
FIG. 9 is a cross-sectional view of another apparatus for manufacturing a powder metal article according to the present invention.

Another apparatus 450 for manufacturing an article, for example a combustor casing 32, from powder material is shown in FIG. 9. The apparatus 450 comprises a six axis CNC, computer numerically controlled, robot arm. The apparatus 450 comprises a first support 452, a second support 454, a third support 456, a fourth support 458, a fifth support 460, a sixth support 462 and a seventh support 464. The second support 454 is rotatably mounted on the first support 452 about a first axis G and the third support 456 is rotatably mounted on the second support 454 about a second axis H. The fourth support 458 is rotatably mounted on the third support 256 about a third axis I and the fifth support 460 is rotatably mounted on the fourth support 458 about a fourth axis J. The sixth support 462 is rotatably mounted on the fifth support 460 about a fifth axis K and the seventh support 464 is rotatably mounted on the sixth support 462 about a sixth axis L. The second, third, fourth and fifth axes H, I, J and K are arranged in a plane perpendicular to the first axis G and the sixth axis L is arranged in a plane perpendicular to the second, third, fourth and fifth axes H, I, J, and K. In this apparatus 450 the first axis G is vertical. The second, third, fourth and fifth axes H, I, J and K are parallel to each other and are horizontal. A hollow canister 58 is supported by the seventh support 464 by grabs 466. The hollow canister 58 is suspended by the supports in this example rather than resting on tables. The apparatus 450 is also provided with a vibrator, devices to rotate the supports, sensors to measure the weight, sensors to measure the level of powder metal in the canister, a hopper for powder metal, pipes to supply the powder metal into the canister and a processor but these have been omitted for clarity. The vibrator may be mounted on the seventh support. It is to be noted in this example that the sixth axis L is coaxial with the axis of the hollow canister 58.

The processor may operate any one of the vibrator and the devices to rotate the supports. Alternatively the processor may operate any two of the vibrator and the devices to rotate the supports. The processor may operate any three of the vibrator and the devices to rotate the supports. The processor may operate any four of the vibrator and the devices to rotate the supports. The processor may operate any five of the vibrator and the devices to rotate the supports. The processor may operate any six of the vibrator and the devices to rotate the supports. The processor may operate all seven of the vibrator and the devices to rotate the supports.

In another arrangement, not shown, similar to that shown in FIG. 8 it may be possible to provide only three rams, rather than four shown in FIG. 8 and to provide the three rams at the corners of first and second triangular tables. Alternatively any suitable number of rams may be used between the first and second table to provide rotation about one or more axes of rotation.

In the examples previously described the canister has been rotated about an axis of symmetry, e.g. the canister has been rotated about an axis which is coaxial with the axis of the cylindrical canister. In another arrangement, not shown, it may be possible to arrange for rotation of the canister about an axis parallel to but not coaxial with the axis of the canister. In another arrangement it may be possible to arrange for rotation of the canister about an axis parallel and coaxial with the axis of the canister as well as for rotation about an axis parallel to but not coaxial with the axis of the canister.

The pipes may comprise stainless steel or other suitable metal to resist erosion. The internal surfaces of the pipes are smooth to minimise friction to reduce the possibility of the powder material blocking the pipes. The pipes have large radius bends and may be arranged in a helical manner to permit movements of the canister and to minimise stresses within the pipes and buckling of the pipes.

The apparatus in each of the embodiments may be mounted on a vibration isolating arrangement to minimise the transmission of vibrations from the apparatus to a building within which the apparatus is enclosed.

The vibrator may be arranged to indirectly, or directly, vibrate the canister. The vibrator for example may comprise a transducer acoustically coupled directly to the canister or acoustically coupled indirectly to the canister via all the intervening structures, e.g. all the intervening tables or intervening supports. The vibrator may comprise a hammer arranged to directly hit, or strike, and vibrate the canister. There may be a plurality of transducers to directly or indirectly vibrate the canister or a plurality of hammers to directly vibrate the canister.

Although FIGS. 3 and 4 have arranged for the second table to be rotatably mounted on the first table about a horizontal axis and for the third table to be rotatably mounted on the second table such that the second table is a tilting table and the third table is a rotary table it may be equally possible for the second table to be rotatably mounted on the first table about a vertical axis and for the third table to be rotatably mounted on the second table about a horizontal axis such that the second table is a rotary table and the third table is tilting table. Similarly although FIG. 5 has arranged for the second and the third tables to be tilting tables and for the fourth table to be a rotary table it may be equally possible to arrange the second table to be a rotary table and for the third and fourth tables to be tilting tables or to arrange third table to be a rotary table and for the first and fourth tables to be tilting tables.

The present invention provides an apparatus, which may be programmable, to enable variation in the filling conditions of the physical parameters influencing the flow of the powder material into the canister. The apparatus enables multi-axis vibrational load to be imparted to the powder material in the canister for example by rocking the canister backwards and forwards around respective rotational axes and by introducing vibrational oscillations into the walls of the canister. The present invention provides several sensing systems to measure the height of the powder material in the canister, the packing density of the powder material in the canister, the weight of the powder material in the canister and provide feedback. The outputs from the sensing systems are used to control the process variables, leading to real time process control and adjustment via feedback monitoring. The apparatus may change the amplitude of any vibrational oscillations, the angle through which the canister is rocked, or rotated, for each of the axis of rotation. The apparatus provides two, or more, axes around which the canister may be rotated or oscillated back and forth.

Although the present invention has been described with reference to powder metal it is equally applicable to the manufacture of a powder ceramic article from powder ceramic or the manufacture of a cermet article from a combination of powder metal and powder ceramic.

The invention claimed is:

1. An apparatus for manufacturing an article from powder material comprising
   a first table,
   a second table rotatably mounted on the first table about a first axis,
   a third table rotatably mounted on the second table about a second axis,
   a hollow canister supported by the third table,
   a vibrator arranged to vibrate the canister,
   a first device to rotate the second table about the first axis,
   a second device to rotate the third table about the second axis,
   a hopper arranged to supply powder material into the canister,
   a valve to control the flow of powder material from the hopper into the canister and
   a processor to control the valve, the vibrator, the first device and the second device to control the filling of the canister.

2. An apparatus as claimed in claim 1 additionally comprising
   a device to measure the weight of any powder material in the canister, and
   at least one sensor to measure the depth of any powder material in the canister,
   the processor being arranged to analyse the measured depth of any powder material in the canister, the processor being arranged to determine if the measured depth of any powder material in the canister corresponds to the measured weight of any powder material in the canister, and if the processor determines that the measured depth of powder material in the canister is greater than the depth of powder material corresponding to the weight of powder material in the canister then the processor is arranged to vibrate the canister and/or rotate the second table and/or rotate the third table to redistribute any powder material in the canister.

3. An apparatus for manufacturing an article from powder material comprising
- a first support,
- a second support rotatably mounted on the first support about a first axis,
- a third support rotatably mounted on the second support about a second axis,
- a hollow canister supported by the third support,
- a vibrator arranged to vibrate the canister,
- a first device to rotate the second support about the first axis,
- a second device to rotate the third support about the second axis,
- a hopper arranged to supply powder material into the canister,
- a valve to control the flow of powder material from the hopper into the canister and
- a processor to control the valve, the vibrator, the first device and the second device to control the filling of the canister.

4. An apparatus as claimed in claim 3 additionally comprising
- a device to measure the weight of any powder material in the canister, and
- at least one sensor to measure the depth of any powder material in the canister,
- the processor being arranged to analyse the measured depth of any powder material in the canister, the processor being arranged to determine if the measured depth of any powder material in the canister corresponds to the measured weight of any powder material in the canister, and if the processor determines that the measured depth of powder material in the canister is greater than the depth of powder material corresponding to the weight of powder material in the canister then the processor is arranged to vibrate the canister and/or rotate the second table and/or rotate the third table to redistribute any powder material in the canister.

* * * * *